Patented Oct. 3, 1922.

1,431,026

UNITED STATES PATENT OFFICE.

LOUIS NEKRITZ, OF BROOKLYN, NEW YORK.

PROCESS FOR MANUFACTURING LIQUID POLISH.

No Drawing. Application filed May 13, 1922. Serial No. 560,745.

*To all whom it may concern:*

Be it known that I, LOUIS NEKRITZ, a citizen of the United States, residing at Brooklyn, in the county of Kings and State of New York, have invented new and useful Improvements in Processes for Manufacturing Liquid Polish, of which the following is a specification.

My invention relates to a composition of matter for use as a polishing liquid for stoves, and has for its primary object the provision of a compound of this character that can be conveniently applied to the metal parts of a stove by means of a suitable brush, and one which will not give rise to objectionable odors.

A further object of the invention is to provide a composition of matter which will act as a metal preservative and prevent rusting of the metal.

Another object of the invention is to provide a composition of matter which will give to the surface with which it is coated, a relatively permanent lustre.

Another object of the invention is to provide a composition of matter which can be prepared at small cost and without the use of a heating process.

In carrying my invention into practice, I provide the following ingredients:—

Red gum acaroides _____ 2 lbs.
Rosin _____ 1 lb.
Alcohol _____ 1 gal.
Nigrosin _____ ¼ lb.

In the manufacture of the composition of matter, I take all of the above ingredients and mix them together while they are in a cold state, the alcohol acting as a solvent for the red gum acaroides and the rosin. These ingredients are thoroughly mixed together by a process of stirring, and the mass permitted to set for two or three days to precipitate the sediment. I then strain the liquid through a fine mesh cheese cloth, after which, the liquid is commercially fit for use. A preparation manufactured in this manner can be produced at small cost; it gives to the stove or metal surface upon which it is applied, a relatively permanent lustre; it can be applied quickly by means of a brush so as to prevent soiling of the hands of the user, and the process of manufacture is made safe through the fact that all of the ingredients are mixed together while cold. I do not heat the ingredients at any stage of the process of preparing the composition of matter.

It will of course be understood that I do not limit myself to the exact proportions of parts and that the amounts of parts or ingredients, can be changed without departing from the spirit of my invention.

What is claimed as new is:—

A composition of matter consisting of red gum acaroides 2 lbs.; rosin 1 lb.; alcohol 1 gallon and nigrosin ¼ pound, all of said ingredients mixed together while cold.

In testimony whereof I have affixed my signature.

LOUIS NEKRITZ.